United States Patent

Rouail

Patent Number: 5,176,347
Date of Patent: Jan. 5, 1993

[54] BRACKET ASSEMBLY FOR MOUNTING APPLIANCE

[75] Inventor: George A. Rouail, Chicago, Ill.

[73] Assignee: Victoria Rouail, Chicago, Ill.

[21] Appl. No.: 674,453

[22] Filed: Mar. 25, 1991

[51] Int. Cl.⁵ .............................................. F16B 47/00
[52] U.S. Cl. ........................... 248/206.2; 248/225.2; 248/301
[58] Field of Search ............... 248/206.2, 205.6, 301, 248/304, 305, 306, 307, 309.4, 225.2, 225.1, 224.4, 205.5, 206.5, 309.3

[56] References Cited

U.S. PATENT DOCUMENTS

| | | | |
|---|---|---|---|
| 3,352,429 | 11/1967 | Magnuson | 248/304 X |
| 3,861,631 | 1/1975 | Shorin | 248/301 X |
| 4,121,800 | 10/1978 | McClellan | 248/301 X |
| 4,372,450 | 2/1983 | Licari et al. | 248/304 X |
| 4,458,869 | 7/1984 | Mayo | 248/225.1 |
| 4,903,925 | 2/1990 | Park | 248/206.2 X |
| 4,951,909 | 8/1990 | Russo et al. | 248/206.2 |
| 4,979,708 | 12/1990 | Aoki | 248/206.2 X |

FOREIGN PATENT DOCUMENTS 2443587  3/1976  Fed. Rep. of Germany ... 248/206.2

Primary Examiner—Ramon O. Ramirez
Attorney, Agent, or Firm—Dressler, Goldsmith, Shore, Sutker & Milnamow, Ltd.

[57] ABSTRACT

A two-piece bracket assembly for mounting an appliance on a flat surface. One of the pieces is J-shaped, with the large wall portion to be secured to a flat surface. A T-shaped member secured to an appliance connects with the bracket to hold the appliance in place.

1 Claim, 1 Drawing Sheet

BRACKET ASSEMBLY FOR MOUNTING APPLIANCE

BACKGROUND OF THE INVENTION

The invention relates to the mounting of appliances on a surface whereby when the appliance is held in place it can be used in the position in which it is located, but can be readily removed to permit use of the appliance in a different location. The mounting bracket assembly can be used with a wide variety of different types of appliances, such as a hairdryer, curling iron, electric tooth brush, etc. Such a bracket can be used for storage but, as aforementioned, is particularly useful when it is desired to utilize the appliance while it is held in place, such as, for example, in the case of a hairdryer.

FIELD OF THE INVENTION

The field of the invention particularly relates to equipment of the type that can be used while located in a mounted position and can be readily removed and used free of its mounted position. The bracket assembly must be so designed so that when the appliance is located in place and it is turned on it will be operable in the intended manner. In the preferred embodiment, there is shown a bracket assembly for a hairdryer, which hairdryer when in position can be operated to function in the intended manner without the necessity for the operator to physically hold the hairdryer. The bracket is so designed and will be located so the hairdryer may be turned on and the persons using it will have both hands free to adjust or position their hair while the hairdryer is performing the drying function.

SUMMARY OF THE INVENTION

In accordance with the present invention, there is provided a bracket assembly consisting of two coacting parts. One of the parts is secured to the appliance, such as a hairdryer, and is essentially T-shaped in configuration. The other part is generally J-shaped and provides a slot into which the leg portion of the T-shaped bracket fits, with the head portion fitting into the recess formed between the two walls of the J-shaped bracket. In the normal position, the hairdryer will hang in a manner so that when it is turned on it will be effective to dry the person's hair using the dryer without having to be held.

The bracket is mounted on a flat surface, such as a mirror or wall section, in the area where the dryer is to be used by a suction cup which has a projection that is press-fitted into an opening in the J-shaped bracket. The T-shaped bracket has a leg portion which is secured to the hairdryer in a conventional method.

The details of the invention will be seen from the following drawings.

DESCRIPTION OF THE PREFERRED EMBODIMENT

Figure 1:
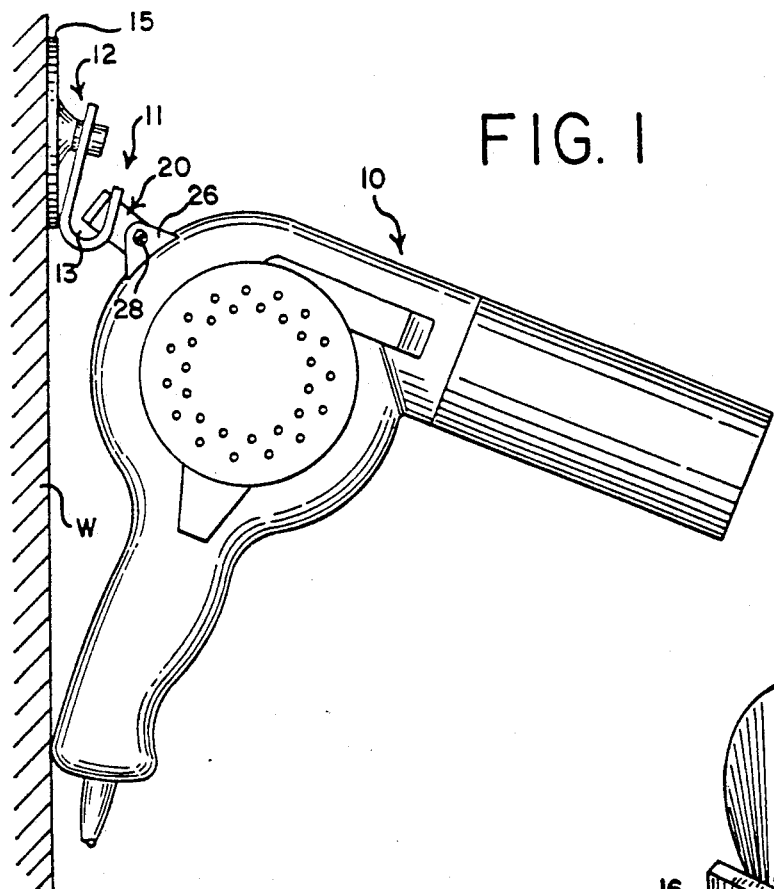
FIG. 1 is a view showing a hairdryer located in position relative to a wall by applicant's novel bracket assembly.
Figure 2:
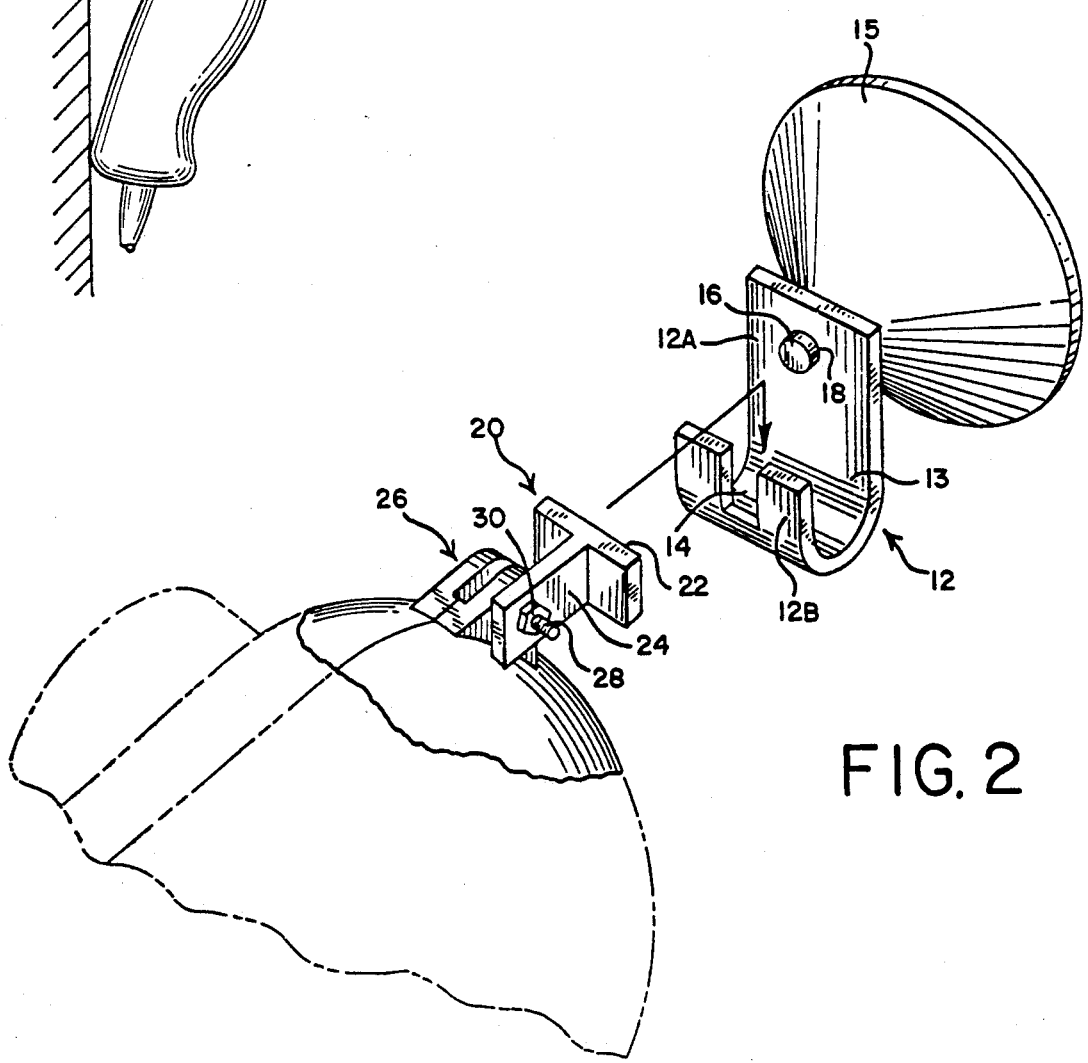
FIG. 2 is an exploded perspective view showing the details of the bracket assembly.

Referring now to FIG. 1, there is shown a hairdryer 10 which is held in place relative to a wall W by the bracket assembly 11. As shown, the mounting assembly permits the hairdryer to be directed in a downward direction so that the nozzle portion of the dryer is aimed at the user.

The bracket assembly 11 consists of two different sections, (1) a J-shaped bracket 12 having spaced wall portions 12A and 12B between which there is defined the recess 13. The lower or front wall 12B of the bracket defines a slot 14 which receives a bracket member 20 secured to the hairdryer 10.

The J-shaped bracket 12 is held in place relative to a wall portion by a suction cup 15 which includes a projection 16 that is press-fitted into an opening 18 in the wall 12A of the bracket 12.

The other half of the bracket assembly is essentially a T-shaped bracket 20 that includes a head portion 22 and a leg portion 24. The back of the hairdryer is provided with a fitting 26 to which the leg portion 24 of the T-shaped bracket member 20 is secured by means of a bolt 28 and nut 30.

Thus, when the hairdryer is mounted in position on the wall W, the leg 24 extends through the slot 14 and the head portion 22 is located in the recess 13 of the bracket 12, as shown in FIG. 1.

It is, of course, intended to cover by the appended claims all such modifications that fall within the true spirit and scope of the invention.

What is claimed is:

1. A bracket assembly comprising a first generally J-shaped member defined by longer and shorter spaced walls defining a recess and a connecting portion therebetween, an opening defined in the longer wall, which opening is located above the short wall, a suction cup having a back wall, a pin formed in the back wall of said suction cup and press-fitted into the opening in the longer wall for securing the suction cup to said longer wall of the J-shaped member, the shorter wall portion of said J-shaped member defining a generally rectangular slot, a T-shaped member adapted to be secured to an appliance, said T-shaped member including a head portion adapted to be received in the recess defined by said spaced walls of the J-shaped member, and a generally rectangular leg portion that fits in the slot defined by the shorter wall portion of the J-shaped bracket, whereby when the T-shaped member is disposed within the J-shaped member, the appliance will be retained in position relative thereto.

* * * * *